US012437545B2

(12) United States Patent
Ebisawa et al.

(10) Patent No.: US 12,437,545 B2
(45) Date of Patent: Oct. 7, 2025

(54) METHOD, APPARATUS, AND PROGRAM FOR PROCESSING VIDEO INFORMATION

(71) Applicant: RISO KAGAKU CORPORATION, Tokyo (JP)

(72) Inventors: Takashi Ebisawa, Tokyo (JP); Toshiharu Fujiyoshi, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 18/613,279

(22) Filed: Mar. 22, 2024

(65) Prior Publication Data
US 2024/0331388 A1 Oct. 3, 2024

(30) Foreign Application Priority Data
Mar. 29, 2023 (JP) ................. 2023-053216

(51) Int. Cl.
*G06V 20/52* (2022.01)
*G06F 21/62* (2013.01)
*G06V 40/16* (2022.01)

(52) U.S. Cl.
CPC .......... *G06V 20/52* (2022.01); *G06F 21/6209* (2013.01); *G06V 40/172* (2022.01); *G06F 2221/2141* (2013.01)

(58) Field of Classification Search
CPC ...... G06V 20/52; G06V 40/172; G06V 20/41; G06F 21/6209; G06F 2221/2141
See application file for complete search history.

(56) References Cited

U.S. PATENT DOCUMENTS

| | | | |
|---|---|---|---|
| 7,147,147 B1 * | 12/2006 | Enright | G07F 19/20 705/45 |
| 11,704,908 B1 * | 7/2023 | Xu | G06V 40/172 382/181 |
| 2016/0148016 A1 * | 5/2016 | Rylski | G08B 13/19686 348/143 |
| 2019/0149875 A1 * | 5/2019 | Laporte | H04N 21/488 725/32 |
| 2020/0358947 A1 * | 11/2020 | Hagio | H04N 23/611 |
| 2021/0019645 A1 * | 1/2021 | Petrey, Jr. | G06V 40/16 |
| 2021/0312183 A1 * | 10/2021 | Bendre | G06V 10/764 |
| 2021/0334549 A1 * | 10/2021 | Ekkel | G08B 13/19641 |
| 2021/0409825 A1 * | 12/2021 | Meyer | H04N 21/26208 |

(Continued)

FOREIGN PATENT DOCUMENTS

JP 2010-103867 A 5/2010
WO WO-2024030357 A1 * 2/2024

OTHER PUBLICATIONS

Kento Kobayashi et al., "A New Surveillance Camera System to Achieve Both Crime Prevention and Privacy Protection", Information Processing Society of Japan, Jan. 2016, vol. 57, No. 1, pp. 172-183, English Abstract.

*Primary Examiner* — Fernando Alcon
(74) *Attorney, Agent, or Firm* — GREENBLUM & BERNSTEIN, P.L.C.

(57) ABSTRACT

A system includes a video information receiving unit that receives video information of an unspecified person, an abnormal status detecting unit that detects an abnormality related to a person based on the video information, and an abnormal status video generating and storing unit that controls processing for the video information of persons in the video information based on the detection of the abnormality.

12 Claims, 4 Drawing Sheets

(56) References Cited

U.S. PATENT DOCUMENTS

| | | | | |
|---|---|---|---|---|
| 2022/0237910 | A1* | 7/2022 | Hirai | G05D 1/12 |
| 2022/0292832 | A1* | 9/2022 | Ong | H04N 7/18 |
| 2022/0382840 | A1* | 12/2022 | Weston | G06V 40/30 |
| 2022/0398908 | A1* | 12/2022 | Tazume | G08B 13/19613 |
| 2023/0224339 | A1* | 7/2023 | Hixson | G06V 20/52 |
| | | | | 348/14.08 |
| 2023/0360402 | A1* | 11/2023 | Szuba | G06V 10/7747 |
| 2023/0401492 | A1* | 12/2023 | Platten | G06V 10/809 |
| 2024/0048839 | A1* | 2/2024 | Pujari | G06V 40/161 |
| 2024/0143601 | A1* | 5/2024 | Blais-Morin | G06F 18/24133 |
| 2024/0179371 | A1* | 5/2024 | Usui | H04N 21/44218 |
| 2024/0331336 | A1* | 10/2024 | Pfeiffer | G06T 7/20 |
| 2025/0124714 | A1* | 4/2025 | Singh | G06V 40/20 |

* cited by examiner

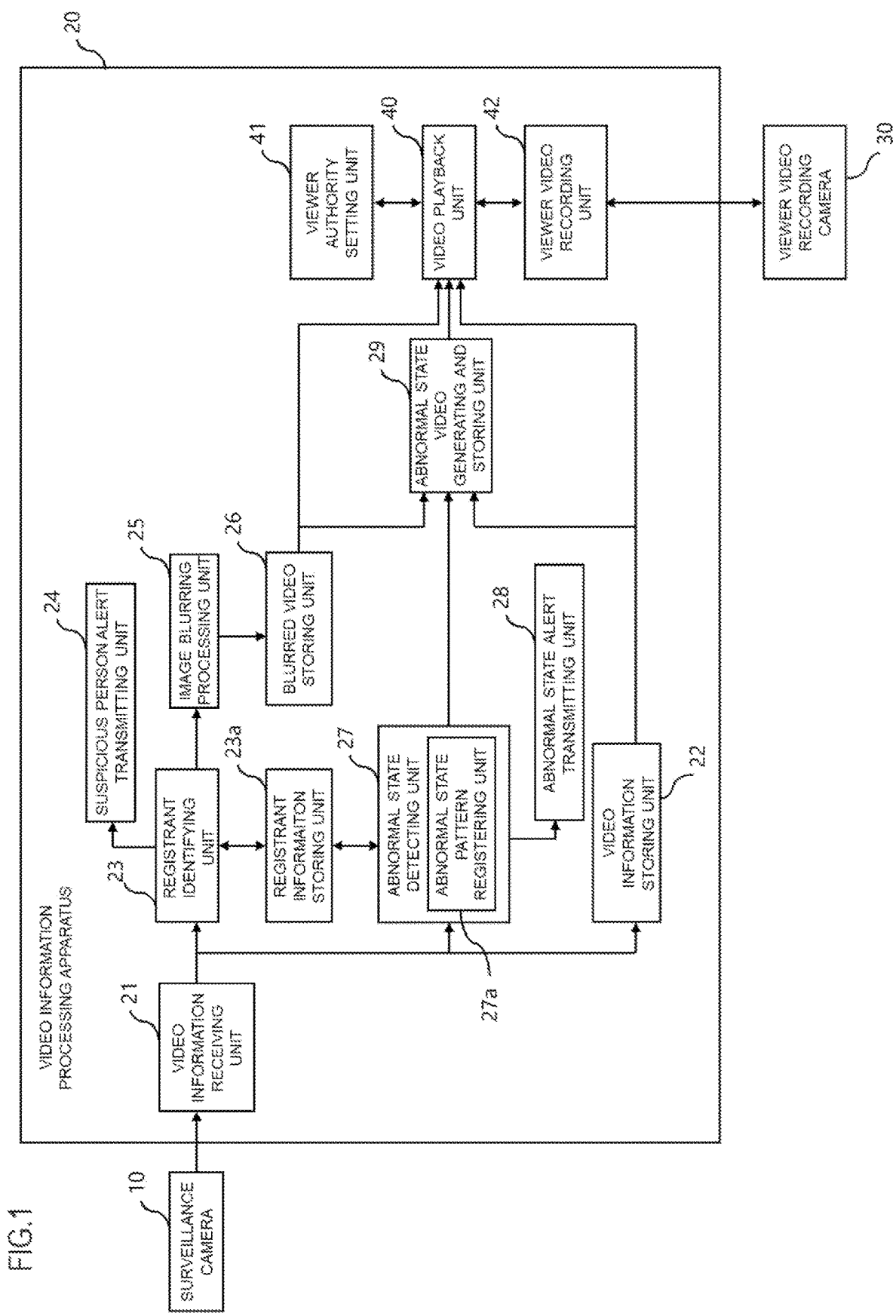

| MOTION PARAMETER A DISTANCE BETWEEN REGISTRANTS | NORMAL STATE FAR | ⇔ INTERMEDIATE | ABNORMAL STATE CLOSE |
|---|---|---|---|

| MOTION PARAMETER B MOVEMENT SPEED OF INDIVIDUAL REGISTRANT | SLOW | INTERMEDIATE | FAST |
|---|---|---|---|

| MOTION PARAMETER C MOVEMENT SPEED BETWEEN REGISTRANTS WHEN IN CONTACT | SLOW | INTERMEDIATE | FAST |
|---|---|---|---|

| MOTION PARAMETER D NUMBER OF CONTACTS BETWEEN REGISTRANTS WITHIN A CERTAIN AMOUNT OF TIME | FEW (~5 TIMES) | INTERMEDIATE (6~10 TIMES) | MANY (11 TIMES~) |
|---|---|---|---|

| AUDIO PARAMETER A AUDIO ANALYSIS DURING CONTACT BETWEEN REGISTRANTS | BULLYING WORDS DETECTED (~1 TIME) | BULLYING WORDS DETECTED (2~4 TIMES) | BULLYING WORDS DETECTED (5 TIMES~) |
|---|---|---|---|

| AUDIO PARAMETER B AUDIO VOLUME DURING CONTACT BETWEEN REGISTRANTS | SMALL (~20db) | INTERMEDIATE (21~40db) | BIG (41db~) |
|---|---|---|---|

B

| BULLYING PATTERN A | MOTION A (INTERMEDIATE) & MOTION B (FAST) & MOTION C (INTERMEDIATE) & MOTION D (FEW) & AUDIO A (~1 TIME) & AUDIO B (41 db~) |
|---|---|
| BULLYING PATTERN B | ... |
| BULLYING PATTERN C | ... |

FIG.3

| TYPE OF VIDEO INFORMATION | SECURITY GUARD | TEACHER | POLICE |
|---|---|---|---|
| BLURRED VIDEO INFORMATION | ○ | ○ | ○ |
| ABNORMALITY DETECTION VIDEO INFORMATION | × | ○ | ○ |
| RAW VIDEO INFORMATION | × | × | ○ |

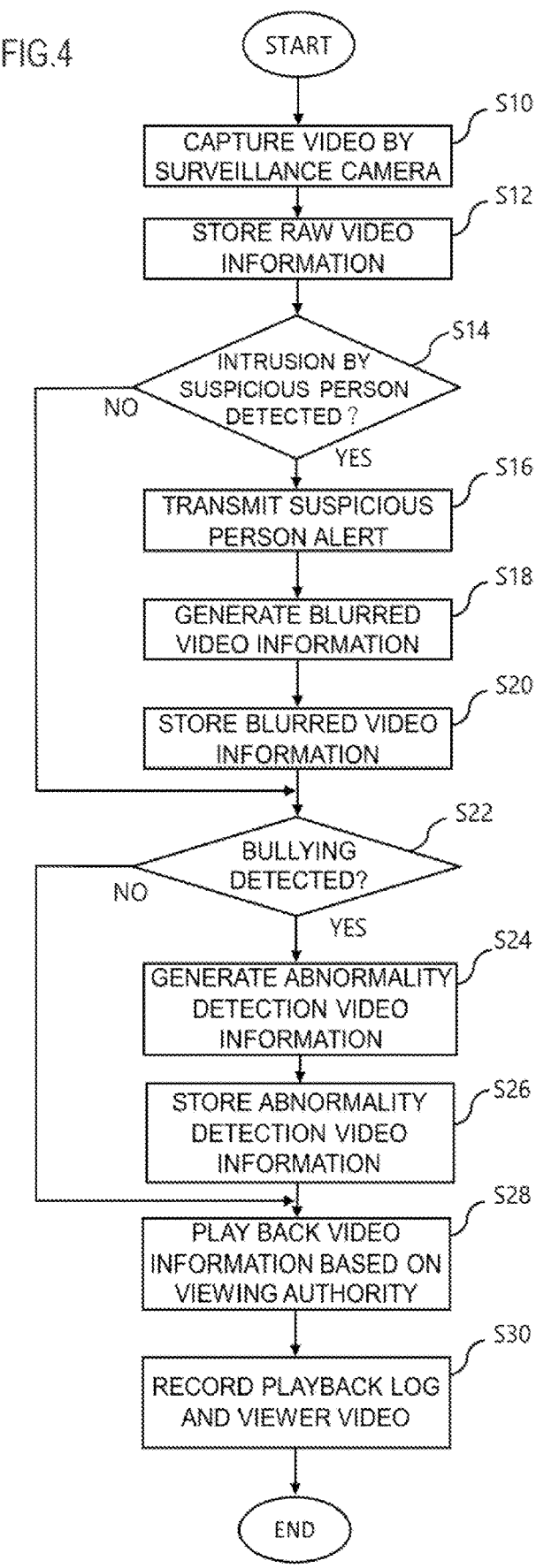

METHOD, APPARATUS, AND PROGRAM FOR PROCESSING VIDEO INFORMATION

CROSS-REFERENCE TO RELATED APPLICATIONS

The present application claims priority under 35 U.S.C. § 119 to Japanese Patent Application No. 2023-053216, filed on Mar. 29, 2023. The above applications are hereby expressly incorporated by reference, in these entireties, into the present application.

BACKGROUND OF THE INVENTION

1. Field of the Invention

The present disclosure is related to a method, an apparatus, and a program for processing video information of unspecified persons.

2. Description of the Related Art

Conventionally, some video information captured by surveillance cameras has been published on social networking services (SNS) without permission. This is undesirable from the viewpoint of privacy protection in that the person of whom the video information was captured cannot control information about themselves.

To solve this problem, "K. Kobayashi et al., 'Surveillance Camera System for Both Privacy Protection and Crime Prevention', Journal of Information Processing Society of Japan, Vol. 57, No. 1, pp. 172-183 (January 2016)", for example, proposes the following requirements for video information obtained by surveillance cameras:
1. A subject can determine whether their facial information is made public or private by their own will.
2. Subjects who wish to keep their facial information private will not be identified unless fraud is committed.
3. When utilizing videos for criminal investigations, etc., all confidential facial information may be revealed.

The above requirements will solve the problem from the viewpoints of both privacy protection of subjects and criminal investigations.

In addition, Japanese Unexamined Patent Publication No. 2010-103867 proposes a method in which video information captured by surveillance cameras is degraded to a minimum image quality necessary to determine the status of situations and distributed for normal monitoring work, and when a clear video is required, the degraded video is restored to a higher image quality and utilized.

SUMMARY OF THE INVENTION

Here, the above examples are related to videos captured by surveillance cameras in city streets, etc. However, it is necessary to consider the following points for videos captured by surveillance cameras installed in schools.
1. It is undesirable from the standpoint of privacy protection to use surveillance cameras to capture clear videos of each student in the school. There is a possibility of unauthorized use by administrators (security guards or teachers) who have access to the videos.
2. The problem is that if bullying exists in a school and the bullying is captured by surveillance cameras and made available for viewing, it can have a significant impact on the life of the victims of the bullying (a higher priority than privacy protection). It is also desirable to for bullying to be nipped in the bud in its latent stage before it develops into full blown bullying.
3. If a suspicious person enters a school, it is desirable to prevent recurrence by notifying security guards and teachers at an early stage and by providing law enforcement agencies with video information in which only the suspicious person is clear, so that the law enforcement agencies can identify and investigate the suspicious person.

In other words, it is desirable for the video information captured by surveillance cameras in schools to be able to identify students involved in bullying and suspicious persons who enter the school, while protecting the privacy of students.

The present disclosure has been developed in view of the foregoing circumstances. The present disclosure provides a method, apparatus, and program for processing video information that can protect the privacy of unspecified persons of whom video information has been captured by a surveillance camera in a school and can generate video information that can identify persons involved in bullying, a suspicious person, etc.

A video information processing apparatus of the present disclosure is equipped with a video information receiving unit that receives video information of an unspecified person, an abnormality detecting unit that detects an abnormality related to the person based on the video information, and a processing unit that controls processing for the video information of the person in the video information based on the detection of the abnormality.

According to the video information processing apparatus of the present disclosure, an abnormality related to a person is detected based on video information of an unspecified person, and the processing of the video information of the person in the video information is controlled based on the detection of the abnormality. Therefore, when an abnormality such as the occurrence of bullying or intrusion by a suspicious person, for example, is detected, the privacy of persons included in the video information can be protected by not processing video information of persons involved in bullying or the suspicious person while processing video information of other persons, and video information that can identify the persons involved in bullying or suspicious person can be generated.

BRIEF DESCRIPTION OF THE DRAWINGS

FIG. 1 is a block diagram that illustrates the schematic configuration of an embodiment of a video information management system.

FIG. 2 is a collection of diagrams that illustrate examples of a level judgment table and a bullying judgment table.

FIG. 3 is a diagram that illustrates an example of a viewing authorization table.

FIG. 4 is a flowchart for explaining the flow of processes performed by the video information management system illustrated in FIG. 1.

DETAILED DESCRIPTION OF THE EMBODIMENTS

An embodiment of a video information management system 1 that employs an embodiment of the video information processing apparatus of the present disclosure will be described in detail with reference to the drawings. FIG. 1 is a block diagram that illustrates the schematic configuration of the video information management system 1 of the present embodiment.

The video information management system 1 of the present embodiment acquires video information captured by surveillance cameras installed in schools and detects abnormalities, such as the occurrence of bullying or intrusion by a suspicious person, for example, from the video information.

The video information management system 1 is a system that controls blurring processing of video information based on the detection of the aforementioned abnormality, and plays back the video information after the blurring processing is administered. Specifically, for example, if the system detects the occurrence of bullying, it does not blur the persons involved in bullying (either their entire bodies or parts of the person, such as their faces), but generates and plays back video information with blurring processing applied to other persons. When an intrusion by a suspicious person is detected, video information is generated and played back with no blurring processing applied to the suspicious person and blurring processing applied to other persons. The control of the blurring processing for video information is not limited to the above example, and other embodiments will be described in detail later.

As illustrated in FIG. 1, the video information management system 1 of the present embodiment is equipped with a surveillance camera 10, a video information processing apparatus 20, and a viewer video recording camera 30.

The surveillance camera 10 is installed in a school to capture unspecified students, teachers, etc. to obtain video and audio information, and to output the video and audio information to video information processing apparatus 20. The configuration of the surveillance camera 10 is not particularly limited, and any known surveillance camera may be used. In the present embodiment, the surveillance camera 10 which is employed is also capable of capturing audio information. However, a surveillance camera that captures only video information may be employed, and audio information may be acquired using a microphone which is installed separately in the vicinity of the surveillance camera.

Only one surveillance camera 10 is illustrated in FIG. 1. However, surveillance cameras 10 are installed in multiple locations within a school in reality. The surveillance cameras 10 may be installed in each classroom, for example, or in special rooms such as a gymnasium or a school library. In addition, the surveillance cameras 10 are installed in places where many students pass through and where intrusion of suspicious persons should be monitored such as near the school gate. Meanwhile, the surveillance cameras 10 are installed in places such as an area behind the gymnasium, where students do not usually enter but where bullying is likely to occur.

The video information processing apparatus 20 has a video information receiving unit 21, a video information storing unit 22, a registrant identifying unit 23, a suspicious person alert transmitting unit 24, an image blurring processing unit 25, a blurred video storing unit 26, an abnormal state detecting unit 27, an abnormal state alert transmitting unit 28, an abnormal state video generating and storing unit 29, a video playback unit 40, a viewing authority setting unit 41, and a viewer video recording unit 42. In the present embodiment, the registrant identifying unit 23 and the abnormal state detecting unit 27 correspond to the abnormality detecting unit of the present disclosure. In addition, the image blurring processing unit 25 and the abnormal state video generating and storing unit 29 correspond to the processing unit of the present disclosure.

The video information receiving unit 21 receives video and audio information captured by the surveillance camera 10.

The video information storing unit 22 stores the raw video information received by the video information receiving unit 21, that is, video information that has not undergone blurring processing or other processing.

The registrant identifying unit 23 receives the raw video information which is received by the video information receiving unit 21 and recognizes a person included in the input video information. The registrant identifying unit 23 then identifies whether the person who is recognized is a preregistered registrant.

The registrant identifying unit 23 identifies whether the person who is recognized is a registrant based on registrant information which is stored in advance in a registrant information storing unit 23*a*.

The registrant information storing unit 23*a* stores registrant information such as information regarding school personnel including students, teachers, non-teaching staff (including security guards), and parents of students, for example.

Facial video information used to identify whether the person in the video information is a registrant is stored as information regarding registrants. In addition, a student's gender, grade and class, age, name, personality and physical characteristics (height, weight, etc.) are set and input in advance by a teacher or other persons and stored as information regarding student registrants.

The registrant identifying unit 23 identifies whether the person who is in the video information is a registrant by comparing the face video information of the person who is included in the video information captured by the surveillance camera 10 with the face video information of registrants stored in advance in the registrant information storing unit 23*a*.

If the person included in the video information is not a registrant, the registrant identifying unit 23 detects the intrusion of a suspicious person by determining that the non-registrant is a suspicious person. If the intrusion of a suspicious person is detected by the registrant identifying unit 23, the detection information is output to the suspicious person alert transmitting unit 24.

The suspicious person alert transmitting unit 24 transmits alerts of intrusion of a suspicious person to an external device. The external device can be a terminal device in a staff room or security office, for example, or a terminal device owned by a teacher. Alternatively, the external device may be a terminal device of a security company or a police station outside the school. In addition, the alert is not limited to being transmitted to an external device but may also be displayed or an audible alarm of the alert may be output at the video information processing apparatus 20.

The image blurring processing unit 25 applies blurring processing to the video information received by the video information receiving section 21 to generate blurred video information. Specifically, the image blurring processing unit 25 applies blurring processing to the video information of a person who is identified by the registrant identifying unit 23 as a registrant, such that the identity of the person will not be specified. The image blurring processing unit 25 does not apply blurring processing to video information of a person identified by the registrant identifying unit 23 as a non-registrant (suspicious person), such that the identity of the non-registrant can be specified. The blurring processing may be performed by a bokeh process or a mosaic process, but other processes may also be used as long as they degrade the image quality of the video information.

When the intrusion of a suspicious person is detected by the registrant identifying unit 23 and a blurred video information is generated as described above, the image blurring processing unit 25 adds an abnormal status flag to the blurred video information. The abnormal status flag is added to the video information from the time the intrusion of a suspicious person is detected until it is no longer detected. The abnormal status flag is used to identify the blurred video information when the blurred video information is played back by the video playback unit 40.

The blurred video storing unit 26 stores the aforementioned blurred video information together with the abnormal status flag.

The abnormal state detecting unit 27 detects abnormalities mainly related to students based on video information. Abnormalities related to students include, for example, the occurrence of bullying among students and abnormal behavior of a single student. Abnormal behavior of a single student includes cases in which a student is often acting alone away from other students, and cases in which a student is violently acting out. Abnormal behaviors of students are not limited to the examples described above, and other abnormal behaviors may also be detected.

The abnormal state detecting unit 27 recognizes students in the video information based on the information regarding registrants stored in the registrant information storing unit 23a, and detects the movements and sounds of the students who are recognized. The abnormal state detecting unit 27 of this system detects four motion parameters as motions of students. Specifically, the abnormal state detecting unit 27 detects the following four motion parameters: distance information between registrants (hereinafter referred to as "motion parameter A"), the speed of motion of a single registrant (hereinafter referred to as "motion parameter B"), the speed of motion of registrants when in contact with each other (hereinafter referred to as "motion parameter C"), and the number of contacts of a single registrant with other registrants within a certain period of time (hereinafter referred to as "motion parameter D").

In addition, the abnormal state detecting unit 27 of the present embodiment detects two audio parameters from audio information acquired together with the video information as the voices of students. Specifically, the abnormal state detecting unit 27 detects a voice analysis result at the time of contact between registrants (hereinafter referred to as "audio parameter A") and the volume level at the time of contact between the registrants (hereinafter referred to as "audio parameter B") as the two audio parameters.

The audio parameter A, for example, detects words related to bullying from audio information and the number of times they are detected. Frequency analysis of audio information may be performed to detect words related to bullying, or text information may be generated from audio information and words related to bullying may be detected from such text information.

The abnormal state detecting unit 27 then detects the occurrence of bullying based on the four motion parameters and the two audio parameters described above. Specifically, the abnormal state detecting unit 27 has an abnormal state pattern registering unit 27a for detecting the occurrence of bullying. The abnormal state pattern registering unit 27a has the level judgment table illustrated in FIG. 2A and the bullying judgment table illustrated in FIG. 2B.

The abnormal state detecting unit 27 first determines an abnormal state level corresponding to each parameter by referring to the level judgment table illustrated in FIG. 2A, based on the four motion parameters and the two audio parameters.

The abnormal state detecting unit 27 determines which of the three abnormal state levels "far", "intermediate", and "near", for example, is applicable to the motion parameter A. As illustrated in FIG. 2A, the closer the motion parameter A is, the more likely it is that an abnormal state (bullying) is occurring.

In addition, the abnormal state detecting unit 27 determines which of the three abnormal state levels "slow", "intermediate", and "fast", for example, is applicable to the motion parameters B and C. As illustrated in FIG. 2A, the faster the motion parameters B and C are, the more likely it is that an abnormal state (bullying) is occurring.

Further, the abnormal state detecting unit 27 determines which of the three abnormal state levels "few (5 or fewer times)", "intermediate (6 to 10 times)" and "many (11 or more times)", for example, is applicable to the audio parameter A. As illustrated in FIG. 2A, the greater the number that words related to bullying are detected as audio parameter A, the more likely it is that an abnormal state (bullying) is occurring.

Still further, the abnormal state detecting unit 27 determines which of the three abnormal state levels, "small (20 db or less)", "intermediate (21 db to 40 db)" and "large (41 db or more)", for example, is applicable to the audio parameter B. As illustrated in FIG. 2A, the larger the audio parameter B is, the more likely it is that an abnormal state (bullying) is occurring.

The abnormal state detecting unit 27 then detects the occurrence of bullying based on the combination of the abnormal state levels of the four motion parameters and the abnormal state levels of the two audio parameters. Specifically, the abnormal state detecting unit 27 has a bullying pattern registration table illustrated in FIG. 2B. The bullying pattern registration table stores a combination of patterns of the abnormal state levels of the four motion parameters and the two audio parameters when bullying is actually occurring in advance. The combination of patterns is not limited to one, and multiple patterns may be stored in advance.

The abnormal state detecting unit 27 compares the combination of the abnormal state levels of the four motion parameters and the two audio parameters detected from the video information and the audio information with the plurality of combination patterns stored in advance in the bullying pattern registration table. Then, the abnormal state detecting unit 27 detects the occurrence of bullying when the combination of the abnormal state levels of the four motion parameters and the abnormal state levels of the two audio parameters detected from the video information matches one of the plurality of combinations of patterns stored in advance in the bullying pattern registration table.

For the four motion parameters and two audio parameters detected from the video information and the audio information, and the four motion parameters and two audio parameters which are stored in the bullying pattern registration table in advance, the similarity between the corresponding parameters (the similarity is high in the case that the possibility of bullying is high; the similarity is high in the case that the combination of a given motion parameter and a given audio parameter has a high possibility of bullying) may be calculated, and the occurrence of bullying may be detected when the sum of the similarities of the six parameters (the four motion parameters and the two audio parameters) exceeds a threshold value.

When adding the similarities of the six parameters as described above, each of the parameters may be weighted. For example, the weighting may be changed for each location of the surveillance cameras 10 where videos are taken.

Specifically, for example, in special rooms such as the school library and the nurse's office, or an area behind the gymnasium, where bullying is more likely to occur, the weighting for each parameter may be increased, standard weighting may be assigned to classrooms, and weighting may be decreased for entrances and exits such as the school gate, where people enter and exit and there is a greater amount of movement.

The weighting of each parameter may be changed based on the information of the registrant who is the cause of the occurrence of bullying. For example, if gender information is registered as information regarding registrants, the weighting may be changed according to gender. Specifically, in the case of males, the weighting of the motion parameter may be greater than that of the audio parameter, since the bullying is more likely to be violent, and conversely, in the case of females, the weighting of the audio parameter A for detecting words related to bullying may be greater, since the bullying is more likely to be verbal bullying.

If information regarding the personalities of registrants is registered as part of the information regarding registrants, the weighting of all parameters may be reduced if a registrant has a calm personality, and the weighting of all parameters may be increased if a registrant has a rough temperament. The weighting of the parameters may also be changed based on recognition of the personality and mood of a registrant from a facial image of the registrant.

Machine learning may also be employed as a method for detecting the occurrence of bullying. For example, a learned model may be generated by machine learning the relationship between the combination of motion parameters and audio parameters extracted from videos of actual bullying, and the presence of bullying. Then, the occurrence of bullying may be detected by inputting the motion and audio parameters extracted from the video of the surveillance camera 10 into the learned model.

In this case, the location of the surveillance camera 10 and the information regarding registrants, such as the genders and personalities of registrants, may also be used as input parameters to generate a learned model, and the information regarding registrants information may also be input into the learned model to detect the occurrence of bullying.

The abnormal state alert transmitting unit 28 transmits an alert to an external device when an occurrence of bullying is detected by the abnormal state detecting unit 27. The external device may be a terminal device in the staff room or a terminal device owned by a teacher, for example. The alert may be sent to the terminal device of the teacher of the class of the person who was detected as a bully, based on the attributes (class and grade) corresponding to the person. In addition, the alert is not limited to being transmitted to an external device, and the alert may be displayed or an audible alarm of the alert may be output at the video information processing apparatus 20.

The abnormal state video generating and storing unit 29 generates and stores abnormality detection video information which has undergone blurring processing, which is video information taken at the scene of bullying when the occurrence of bullying is detected by the abnormal state detecting unit 27.

The abnormal state video generating and storing unit 29 generates abnormality detection video information using the blurred video information stored in the blurred video storing unit 26 and the raw video information stored in the video information storing unit 22.

Specifically, the abnormal state image generating and storing unit 29 generates abnormality detection video information by using raw video information for the video information of registrants who were the cause of the detection of the occurrence of bullying, and by using blurred video information for the video information of registrants other than the registrants who were the cause of the detection of the occurrence of bullying. In the abnormality detection video information, it is possible to identify who the registrants are that caused the detection of the bullying, while it is not possible to identify who the other registrants are.

Note that in the present embodiment, raw video information is employed for the video information of the registrants who were the cause of the detection of the occurrence of bullying, that is, both the student on the bullying side and the student on the bullied side. However, raw video information may be employed only as video information of the student on the bullying side, and blurred video information following blurring processing may be employed as video information of the student who is being bullied. In this case, the video information of the student who is being bullied may be changed to raw video information upon request by a registrant (a student who is likely to be bullied).

In addition, in the case that the occurrence of bullying is detected by the abnormal state detecting unit 27 and abnormality detection video information is generated as described above, the abnormal state video generating and storing unit 29 adds an abnormal state flag to the abnormality detection video information. The abnormal state flag is added to the video information from the time the bullying is detected until it is no longer detected. The abnormal state flag is used to identify the abnormality detection video information when the abnormality detection video information is played back by the video playback unit 40.

The abnormal state video generating and storing unit 29 then stores the aforementioned abnormality detection video information together with the abnormal state flag.

The video playback unit 40 plays back the blurred video information stored in the blurred video storing unit 26, the abnormality detection video information stored in the abnormality state video generation and storing section 29, or the raw video information stored in the video information storing unit 22 for viewing.

However, the video playback unit 40 switches the playback of the aforementioned blurred video information, abnormality detection video information, and raw video information according to the authority of the viewer.

The viewing authority setting unit 41 has preset viewing authorities for viewers. In this system, security guards, teachers, and police are authorized as viewers who can view the blurred video information, abnormality detection video information, or raw video information, and they respectively have different viewing privileges.

FIG. 3 illustrates an example of a viewing authority table in which viewing authority is set for security guards, teachers and police. The "O" in FIG. 3 indicates that the user has viewing authority, and a blank column indicates that the user does not have the viewing authority. As illustrated in FIG. 3, the police have the authority to view all of the blurred video information, abnormality detection video information, and raw video information. This enables the police to confirm all of the persons who are included in the video information.

In addition, teachers have the authority to view the blurred video information and the abnormality detection video information, but not the raw video information. This enables teachers to confirm non-registered suspicious persons and bullying parties, but not students other than bullying parties, from the video information.

Note that in the case that a teacher views the abnormality detection video information and confirms persons related to the bullying, the information regarding registrants which is registered for these persons, the location of the surveillance camera 10 that captured the video information, and the time of day when the video information was captured may be input as input parameters when generating the learned model of bullying occurrence detection described above.

In addition, security guards have the authority to view only the blurred video information. This enables the security guard to confirm suspicious persons, but not for students or teachers who are included in the video information.

For "teachers" in FIG. 3, the viewable video information may be divided according to homeroom teachers of the students involved in the bullying and other teachers. For example, the viewing authority of teachers other than homeroom teachers of students involved in bullying may be the same as that for security guards, and only homeroom teachers may be able to view two types of video information: blurred video information and abnormality detection video information. The degree of blurring processing may be changed for homeroom teachers and other teachers. For example, the abnormality detection video information that can be viewed by the homeroom teacher may not blur the persons involved in bullying, while the other teachers may be able to view video information that blurs the persons involved in bullying less than the blurred video information, but not as completely as the blurred video information.

The video playback unit 40 obtains the identification information of a viewer, refers to the viewing authority table based on the identification information, and switches the playback of the blurred video information, the abnormality detection video information, and the raw video information based on the viewing authority set for the viewer based on the identification information. The identification information of the viewer includes information that identifies whether the viewer belongs to the police, is a teacher, or is a security guard. The identification information of the viewer is input by input devices such as a keyboard, by reading individual IC cards, and by fingerprint authentication, and is acquired by the video playback unit 40. Based on the acquired identification information, the video playback unit 40 refers to the viewing authority table set in the viewing authority setting unit 41 to identify the viewing authority of the viewer.

The video playback unit 40 may also allow viewers other than police, teachers, and security guards to view the blurred video information in which no suspicious persons have been detected, since the blurring processing is applied to all registered users.

The degree of blurring processing may be different between the blurred video information that can be viewed by all of security guards, teachers, and police, and the abnormality detection video information that can be viewed only by teachers and police. For example, the degree of blurring processing may be greater for the abnormality detection video information.

The viewer video recording unit 42 records video information of the viewer taken by the viewer video recording camera 30. The viewer video recording camera 30 is a camera that captures the viewer of video information played back by the image playback unit 40, and is installed near a monitor on which the video information is played back, for example.

The video information processing apparatus 20 is equipped with a CPU (Central Processing Unit), a semiconductor memory such as a ROM (Read Only Memory) and a RAM (Random Access Memory), storage such as a hard disk, a communication I/F (interface), etc.

An embodiment of the video information processing program is installed in the storage of the video information processing apparatus 20. When this video information processing program is activated by the CPU, the aforementioned functions of the video information processing apparatus 20 are executed.

In the present embodiment, the functions described above are performed by executing the video information processing program by the CPU, but some or all of the functions performed by the video information processing program may be performed by hardware such as an ASIC (Application Specific Integrated Circuit), a FPGA (Field-Programmable Gate Array), or other electrical circuits.

Next, the flow of processes performed by the video information management system 1 of the above embodiment will be described with reference to the flowchart illustrated in FIG. 4.

First, a video of the interior of the school is captured by the surveillance cameras 10 and video information is obtained (S10).

Raw video information captured by the surveillance camera 10 is received by the video information processing apparatus 20 and stored in the video information storing unit 22 (S12).

If intrusion by a suspicious person is detected by the registrant identifying unit 23 (S14, YES), a suspicious person alert is sent to an external device from the suspicious person alert transmitting unit 24 (S16).

If the intrusion of a suspicious person is detected by the registrant identifying unit 23, the blurred video information described above is generated by the image blurring processing unit 25 (S18) and stored in the blurred video storing unit 26 (S20).

If the occurrence of bullying is detected by the abnormal state detecting unit 27 (S22, YES), abnormal state video information is generated (S24) and stored by the abnormal state video generating and storing unit 29 (S26).

Then, the raw video information, the blurred video information, or the abnormality detection video information is played by the video playback unit 40 based on the viewing authority of a viewer (S28) and viewed by the viewer.

In the case that video information is viewed by a viewer, a video of the viewer is captured by the viewer video recording camera 30, and a playback log of the video information and the viewer video information of the viewer are recorded in the viewer video recording unit 42 (S30). The playback log and the viewer video information recorded in the viewer video recording unit 42 are read out as necessary and displayed by the image playback unit 40. This enables the viewing history of the video information captured by the surveillance camera 10 to be confirmed and the viewing of the video information captured by the surveillance camera 10 to be managed.

In the video information management system 1 of the above embodiment, the occurrence of bullying is detected by the abnormal state detecting unit 27, but abnormal behavior of a single student may also be detected as described above. Abnormal behavior of a single student maybe a student shouting loudly, a student wielding tools such as cleaning equipment, or a student violently hitting a desk, wall, or the like, for example. In the same manner as in the case of detecting bullying, audio and motion parameters can be set in advance according to the aforementioned abnormal behaviors of a single student, and the occurrence of abnormal behavior by a single student can be detected based on the combination of audio and motion parameters in the same manner as detecting bullying employing the bullying pattern registration table.

Isolated behavior may also be detected as an abnormal behavior by a single student. This is because there is a high possibility that a student who is acting in isolation is a target of bullying. Isolated behavior can be detected, for example, by detecting that a registrant is alone in the same location for a certain period of time. Since the location of isolated behavior is limited, for example, to rooftops, the locations of the surveillance cameras 10 may be limited.

In addition, the occurrence of a life threatening emergency situation, for example, a registrant holding a dangerous object such as a knife, may be detected by the abnormal state detecting unit 27 separately from the bullying detection and isolated behavior detection described above. The detection of an emergency situation can be based on the motion and audio parameters of registrants, as well as dangerous objects such as knives, for example, that are also detected in the video information. However, the emergency situation is not limited to possession of a knife, but other emergency situations may be presumed and detected.

If the occurrence of an emergency situation is detected by the abnormal state detecting unit 27, the aforementioned restrictions on viewing video information may be temporarily lifted such that anyone can playback and confirm raw video information.

If the occurrence of an emergency situation is detected by the abnormal state detecting unit 27, an emergency situation alert may be sent to a terminal device of the police or a security company. In this case, raw video information may be sent to the police or security company, or a link (URL (Uniform Resource Locator)) that enables viewing of the raw video information may be sent.

In the video information management system 1 of the above embodiment, blurring processing is applied as a process to the video information captured by the surveillance camera 10, but instead of blurring processing, a process to convert persons into general avatars may be performed.

In the case that persons are converted into general avatars, if bullying is repeated many times, that is, if the number of bullying occurrences detected exceeds a preset threshold, for example, the video information of all persons in the raw video information can be converted into avatars, the avatars can be made to look like the bullying is happening to each other, and anyone may be able to view the video information.

According to the video information management system 1 of the above embodiment, an abnormality related to an unspecified person is detected based on the video information of the person, and the processing of the video information of the person in the video information is controlled based on the detection of the abnormality. Therefore, when the system detects an abnormality such as the occurrence of bullying or intrusion by a suspicious person, for example, it can protect the privacy of the persons included in the video information and generate video information that can identify the persons involved in bullying or the suspicious person by not performing blurring processing the video information of the persons involved in bullying or the suspicious person and by performing blurring processing on the video information of other persons. In addition, by identifying the persons involved in bullying, the occurrence of further bullying can be suppressed.

In addition, according to the video information management system 1 of the above embodiment, the playback of raw video information, blurred video information, and abnormality detection video information is switched based on the viewing authority of the viewer. This enables only the necessary video information to be provided according to the authority of the viewer and it possible to prevent unauthorized use of video information.

According to the video information management system 1 of the above embodiment, the video information of a viewer who has viewed played back video information is recorded, such that the viewing history of the video information captured by the surveillance camera 10 can be confirmed and the viewing of the video information captured by the surveillance camera 10 can be managed, as described above.

According to the video information management system 1 of the above embodiment, an emergency situation is detected based on the video information captured by the surveillance cameras 10, and when an emergency situation is detected, restrictions on viewing the video information are temporarily lifted such that anyone can replay and confirm the raw video information, enabling immediate confirmation of the occurrence of an emergency situation and evacuation actions.

According to the video information management system 1 of the above embodiment, the accuracy of abnormality detection can be improved because the abnormality detection is based on audio information at the time the video information is captured.

The present disclosure is not limited to the above embodiment, but can be embodied by modifying the components to the extent that it does not depart from the spirit thereof at the implementation stage. Also, various configurations can be formed by appropriate combinations of the plurality of components disclosed in the above embodiment. For example, all of the components of the embodiment may be combined as appropriate. It is, of course, possible to make various modifications and applications within a scope that does not depart from the purpose of the disclosure.

The following items are further disclosed with respect to the present disclosure.

(Item 1)

The video information processing apparatus of the present disclosure is equipped with a video information receiving unit that receives video information of an unspecified person, an abnormality detecting unit that detects an abnormality related to the person based on the video information, and a processing unit that controls processing for the video information of the person in the video information based on the detection of an abnormality.

(Item 2)

The video information processing apparatus of Item 1 may be equipped with a viewing authority setting unit in which viewing authority for video information prior to and following processing is set for each viewer attribute, and a video playback unit that plays back video information prior to or following processing for viewing based on predetermined viewer attributes.

(Item 3)

The video information processing apparatus of Item 2 may be equipped with a viewer video recording unit that records video information of a viewer who has viewed the video information which is played back by the video playback unit.

(Item 4)

In the video information processing apparatus of Item 2 or Item 3, the abnormality detecting unit may detect an emergency situation based on video information, and the viewing authority setting unit may change the viewing authority when an emergency situation is detected.

(Item 5)

In the video information processing apparatus of any of Items 1 through 4, the abnormality detecting unit may detect an abnormality based on video information and audio information at the time the video information was captured.

(Item 6)

In the video information processing apparatus of any of Items 1 through 5, the video information may be video information taken in a school.

(Item 7)

In the video information processing apparatus of any of Items 1 through 6, the abnormality detecting unit may detect the occurrence of bullying in the school.

(Item 8)

In the video information processing apparatus of Item 7, the processing unit may not process the video information of the person who is the cause of the occurrence of bullying, but may process the video information of persons other than the person who is the cause of the occurrence of bullying.

(Item 9)

In the video information processing apparatus of Items 1 through 8, the abnormality detecting unit may identify whether a person included in the video information is a preregistered registrant, and may detect an abnormality in the case that the video information includes a non-registrant.

(Item 10)

In the video information processing apparatus of Item 9, the processing unit may not process the video information of non-registrants, but may process the video information of registrants.

(Item 11)

A video information processing method the present disclosure receives video information of an unspecified person, detects an abnormality related to the person based on the video information, and controls processing for the video information of the person in the video information based on the detection of the abnormality.

(Item 12)

A video information processing program of the present disclosure causes a computer to execute the steps of: receiving video information of an unspecified person, detecting an abnormality related to the person based on the video information, and controlling processing for the video information of the person in the video information based on the detection of the abnormality

What is claimed is:

1. A video information processing apparatus comprising a processor that executes:
    a video information receiving process that receives video information of an unspecified person;
    an abnormality detecting process that obtains information regarding a plurality of preset motion parameters based on the video information and detects an abnormality related to the person based on a combination of the plurality of obtained motion parameters; and
    a process that controls processing for the video information such that a blurring process is applied to the video information other than that of the person related to the abnormality and the blurring process is not applied to the video information of the person who is related to the abnormality.

2. The video information processing apparatus as defined in claim 1, wherein the processor:
    refers to a viewing authority table in which viewing authority for video information prior to and following processing is set for each viewer attribute; and
    executes a video playback process that plays back video information prior to the blurring process or following the blurring process for viewing based on predetermined viewer attributes.

3. The video information processing apparatus as defined in claim 2, wherein the processor:
    executes a viewer video recording process that records video information of a viewer who has viewed the video information which is played back.

4. The video information processing apparatus as defined in claim 2, wherein:
    the processor detects an emergency situation based on video information; and
    the processor executes a process to change the viewing authority when an emergency situation is detected.

5. The video information processing apparatus as defined in claim 1, wherein:
    the processor executes a process to detect an abnormality based on the video information and audio information at the time the video information was captured.

6. The video information processing apparatus as defined in claim 1, wherein:
    the video information is video information taken in a school.

7. The video information processing apparatus as defined in claim 1, wherein:
    the processor executes a process to detect the occurrence of bullying in a school.

8. The video information processing apparatus as defined in claim 7, wherein:
    the processor does not apply the blurring process to the video information of the person who is the cause of the occurrence of bullying, but applies the blurring process to the video information of persons other than the person who is the cause of the occurrence of bullying.

9. The video information processing apparatus as defined in claim 1, wherein:
    the processor executes a process to identify whether a person included in the video information is a preregistered registrant, and detects an abnormality in the case that the video information includes a non-registrant.

10. The video information processing apparatus as defined in claim 9, wherein:
    the processor does not apply the blurring process to the video information of non-registrants, but applies the blurring process to the video information of registrants.

11. A video information processing method comprising:
    receiving video information of an unspecified person;
    obtaining information regarding a plurality of preset motion parameters based on the video information and detecting an abnormality related to the person based on a combination of the plurality of motion parameters; and
    applying a blurring process to the video information other than that of the person related to the abnormality and not applying the blurring process to the video information of the person who is related to the abnormality.

12. A non-transitory computer-readable recording medium containing a video information processing program that causes a computer to execute:
receiving video information of an unspecified person;
obtaining information regarding a plurality of preset motion parameters based on the video information and detecting an abnormality related to the person based on a combination of the plurality of motion parameters; and
applying a blurring process to the video information other than that of the person related to the abnormality and not applying the blurring process to the video information of the person who is related to the abnormality.

* * * * *